United States Patent [19]

Wiedenhöfer et al.

[11] Patent Number: 4,559,001

[45] Date of Patent: Dec. 17, 1985

[54] APPARATUS FOR SEALING THE EDGES OF INSULATING GLASS PANELS

[75] Inventors: Heinrich Wiedenhöfer, Gelsenkirchen; Tibor Szabo, Radevormwald, both of Fed. Rep. of Germany

[73] Assignee: Flachglas Aktiengesellschaft, Furth, Fed. Rep. of Germany

[21] Appl. No.: 591,791

[22] Filed: Mar. 21, 1984

[30] Foreign Application Priority Data

Mar. 23, 1983 [DE] Fed. Rep. of Germany ....... 3310441

[51] Int. Cl.[4] ............................................. A23G 1/20

[52] U.S. Cl. .................................. 425/114; 156/107; 156/109; 156/350; 156/351; 156/357; 156/500; 264/261; 425/135

[58] Field of Search ............... 156/107, 351, 109, 357, 156/350, 500, 244.13; 428/34; 264/261; 425/114, 135

[56] References Cited

U.S. PATENT DOCUMENTS

| | | | |
|---|---|---|---|
| 2,275,812 | 3/1942 | Woelfel | 264/261 |
| 3,852,149 | 12/1974 | Sitter et al. | 156/109 |
| 4,014,733 | 3/1977 | Loubet | 156/500 |
| 4,085,238 | 4/1978 | Chenel et al. | 156/500 |
| 4,356,614 | 11/1982 | Käuferle et al. | 156/109 |

*Primary Examiner*—John J. Gallagher
*Attorney, Agent, or Firm*—Karl F. Ross; Herbert Dubno

[57] ABSTRACT

A glass panel whose edges are to be sealed is displaced in an upright condition standing on one edge into a sealing station where the conveyor supporting it raises somewhat whereupon suction grippers carried on a stationary frame engage within the edges of the workpiece. Then the conveyor lowers away from the workpiece, which is still upright, so that all of its edges are unobstructed. An extruder then moves vertically and horizontally around the workpiece to seal its edges. An unloading conveyor presses its own set of suction grippers against a face of the workpiece within its edges so they stick to the sealed workpiece. The suction grippers of the stationary frame then release the workpiece to those of the unloading conveyor which subsequently displaces it while it is still upright into a takeoff station.

3 Claims, 4 Drawing Figures

APPARATUS FOR SEALING THE EDGES OF INSULATING GLASS PANELS

FIELD OF THE INVENTION

The present invention relates to sealing the edges of insulating glass panels. More particularly this invention concerns an edge-sealing apparatus and method which work on upright panels, that is panels lying in vertical planes.

BACKGROUND OF THE INVENTION

An insulating glass panel or so-called thermopane has two or more glass sheets separated by annular peripheral spacers to form an insulating dead-air space. Since it is essential that the space between the glass sheets be perfectly sealed with respect to the exterior, so that dirt cannot enter this space and so that condensation cannot occur therein, extreme precautions are taken during manufacture. A sandwich is made of two or more perfectly clean and identical glass sheets flanking one or more annular spacer rings that lie somewhat inward of the aligned outer peripheries of these sheets. This is done in a controlled environment of low-humidity clean air. Then the outwardly open groove that runs around the edge of this sandwich between the sheets is filled with a viscous synthetic-resin mass that hardens, adhering to both sheets and to the spacer. Once hard this mass totally seals off the space between the sheets.

In a production-line operation this sealing of the edges is done on the panels arranged horizontally by an automatic extruding device such as described in German patent documents Nos. 2,834,902 and 2,845,475 (see also U.S. Pat. Nos. 3,974,011 and 3,947,311). This device is a pendant head which is suspended above a conveyor that can move the workpiece past underneath it. The extruder head can rotate about a vertical axis. The conveyor is provided underneath this head, which is normally set up so it can move longitudinally in the travel direction and transversely thereto, with a short transverse conveyor, with clamping devices, and with some stops. In this apparatus the stationary horizontal workpiece is sealed by running the sealing device peripherally around it, changing nozzle orientation 90° and turning 90° at each corner. Thus the apparatus takes up quite a bit of floorspace, and for efficiency of operation is normally set up so that while the workpiece is being sealed on one side of the apparatus the piece just sealed in the other side of the apparatus is being exchanged for a workpiece needing edge sealing.

Another system is described in German patent document No. 2,843,861 filed Oct. 1, 1980 by H. W. Beil. In this arrangement the unsealed sandwich is transported in upright position on rollers or a conveyor belt to the sealing station where suction grippers constituted as large suction cups connected to the intake of a compressor can engage against one face of it and lift it up off the conveyor. The extruder head is rotatable about a horizontal axis and is first displaced vertically to seal one vertical edge of the sandwich, after which the sandwich is pivoted 90° to seal one horizontal edge. The head is pivoted through 90° again and moves vertically along the next edge, whereupon it again pivots and the workpiece is moved horizontally past it to seal the last horizontal edge. Thus the vertical edges are sealed by moving the head relative to the workpiece and the horizontal edges are sealed by moving the workpiece relative to the head.

Unloading the sealed panel from such an apparatus is normally a manual operation, assisted perhaps by a small crane. In addition such an apparatus is fairly bulky, at least twice as long as the longest panel being sealed. The prior-art devices in general are wasteful of space and do not transport the heavy workpiece with the sureness and gentleness needed, especially as the freshly sealed edges of the workpiece normally are somewhat more fragile than they will be when cured somewhat.

OBJECTS OF THE INVENTION

It is therefore an object of the present invention to provide an improved apparatus for sealing the edges of an insulating glass panel.

Another object is the provision of such an apparatus for sealing the edges of an insulating glass panel which overcomes the above-given disadvantages, that is which takes up minimal space and which operates surely while treating the glass workpieces gently.

SUMMARY OF THE INVENTION

An apparatus according to the invention for sealing the edges of an insulating glass workpiece having outer edges has an upstream conveyor including a conveyor for supporting the workpiece upright by one edge and displacing the edge-supported workpiece in a transport direction downstream from an upstream loading station to a sealing station. An upright holding frame is provided in the sealing station adjacent a vertically displaceable portion of the conveyor. An actuator is connected to this conveyor portion for displacing same and the workpiece supported by its lower edge thereon between upper and lower positions. A lateral holding unit including a first set of suction grippers horizontally displaceable in the sealing station into and out of engagement with the workpiece in the upper position of same can pull the workpiece tightly in position on the holding frame. A sealing device has a head in the station for sealing the edges of the workpiece held by the grippers against the frame and is supported on a guide including vertical and horizontal supports for movement horizontally along the horizontal edges of the workpiece and vertically along vertical edges thereof while directing the head at the edge it is traveling along. An unloading carriage is displaceable substantially without interfering with the holder carriage or sealing head from the sealing station to an unloading station downstream therefrom and has a second set of suction grippers horizontally displaceable on the unloading carriage perpendicular to the transport direction. A controller connected to the two sets of suction gripper displaces the second set of the unloading carriage against the workpiece held therein by the first set and then releasing the first set from the workpiece.

This system is very compact. The edges of the workpiece are sealed while same is solidly held in an upright position, so that minimal floor space is taken up. The grippers always engage the workpiece inward of its edges so they do not interfere at all with the sealing operation. The overall cycling of the machine is also increased considerably, as the unloading carriage can slide in and take out the workpiece the instant it is finished, and the upstream conveyor can meanwhile bring a new workpiece into position immediately behind the exciting finished workpiece.

According to another feature of this invention the holding frame is tipped at a small angle to the horizontal. The unloading means tips it back into a perfectly vertical position when it carries it off.

In addition this unloading means according to the invention includes unloading trucks each having a plurality of seats in which the workpiece can stand, the seats being parallel to the transport direction and spaced horizontally and perpendicular thereto and further control means for synchronously displacing the trucks through a distance equal to the horizontal spacing between each seat on displacement of the unloading carriage from out of and back into the sealing station for aligning successive seats with the sealing station. Thus the unloading speed can be very rapid.

In operation, this invention therefore comprises the steps of first supporting the workpiece by its edge with the upstream conveyor from the loading to the sealing station and then lifting the workpiece with the conveyor from a lower into an upper position in the sealing station and then displacing the first set of grippers into engagement with the workpiece in the upper position and pulling it tightly against the holding frame. The conveyor is then disengaged from the workpiece and the sealing head is displaced horizontally along the horizontal edges of the workpiece and vertically along vertical edges thereof while directing the head at the edge it is traveling along to seal the workpiece edges. The unloading carriage is moved into the sealing station and its set of grippers is engaged against the workpiece, whereupon the first set of grippers is released from the workpiece. The carriage then moves downstream to the unloading station and the workpiece is unloaded from it in the unloading station.

Such a method works very smoothly. The workpiece is held solidly and yet gently so no misalignment of the individual sheets is likely. In addition the freshly sealed edges are not normally touched until the workpiece is set down in the unloading station, something that takes place enough time after the sealing operation to give the fresh synthetic resin used for the sealing some time to cure.

DESCRIPTION OF THE DRAWING

The above and other features and advantages will become more rapidly apparent from the following, reference being made to the accompanying drawing in which.

SPECIFIC DESCRIPTION

Figure 1:
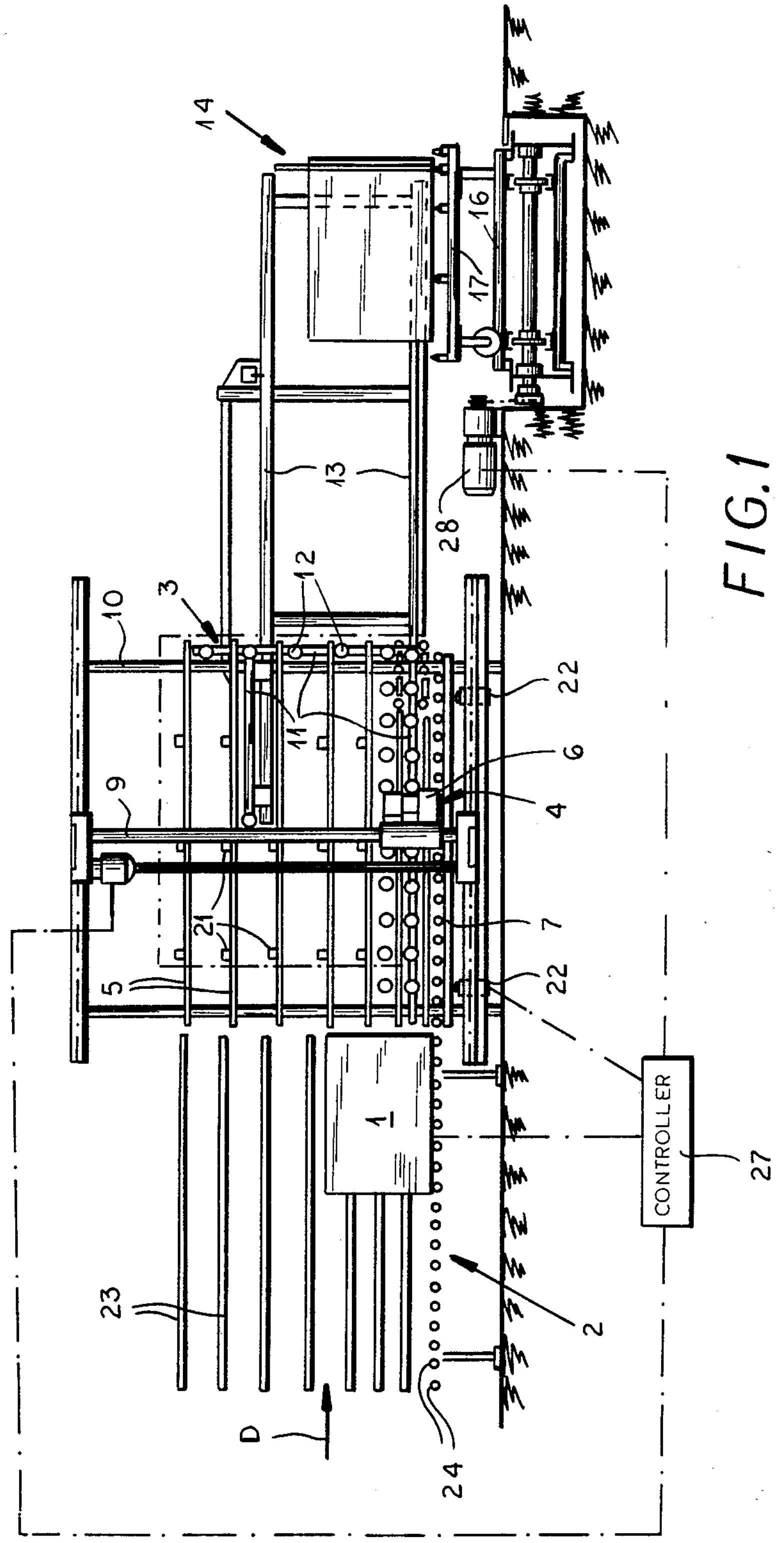
FIG. 1 is a small-scale side view of the apparatus according to this invention.

As seen in FIG. 1 the apparatus of this invention works on workpiece panels 1 each formed by at least two sheets of glass separated by a spacer as described above. The apparatus basically comprises a loading conveyor 2, an unloading conveyor 3 that both move the workpiece 1 mainly in a transport direction D, and an edge-sealing unit or station 4 between them. Both conveyors 2 and 3 transport the workpiece 1 in upright condition, that is standing on one longitudinal edge with the shorter transverse edges upright. In the upstream loading conveyor 2 the workpiece 1 ride on rollers 24 that can be driven and are tilted slightly to the side so that workpieces 1 lean lightly on guide rails 23.

Figure 2:
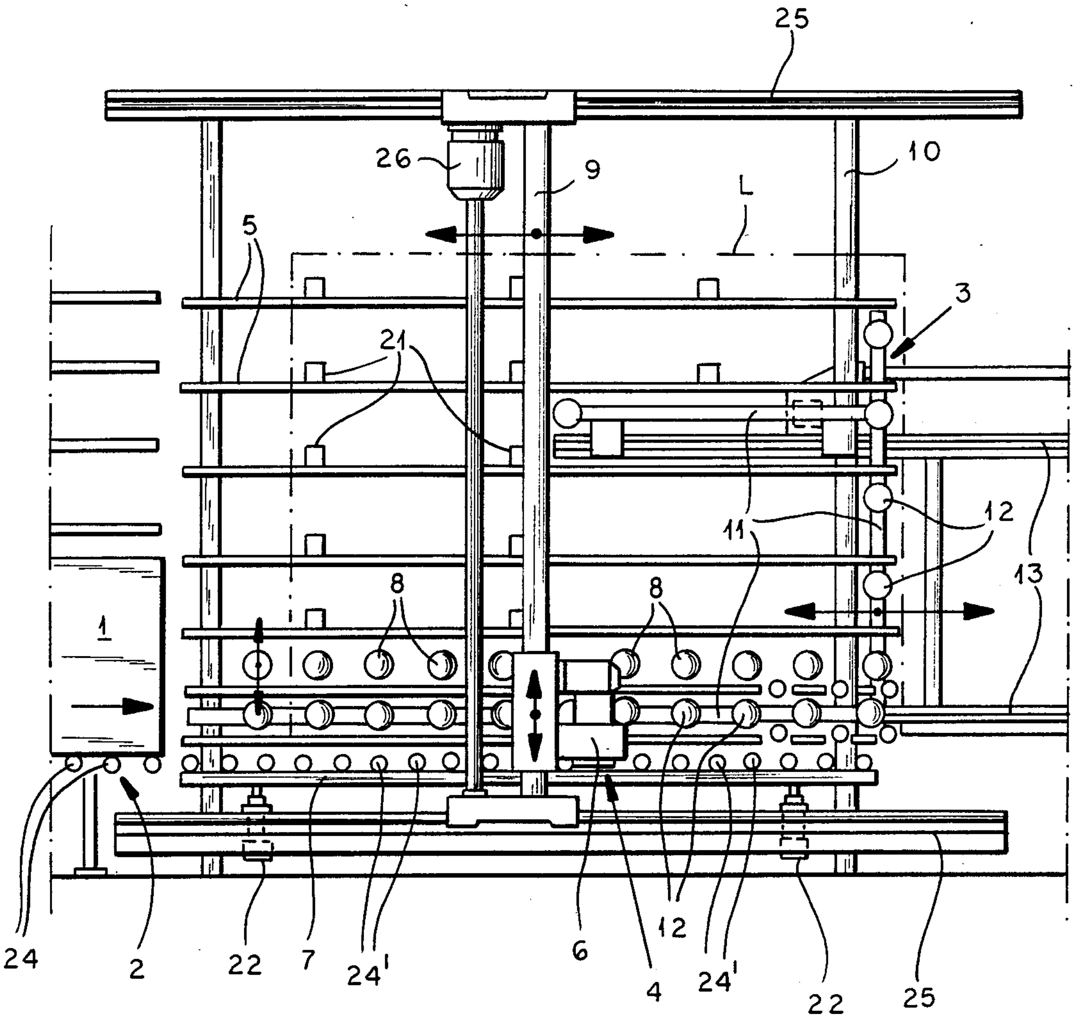
FIG. 2 is a large-scale view of a detail of FIG. 1.
Figure 3:
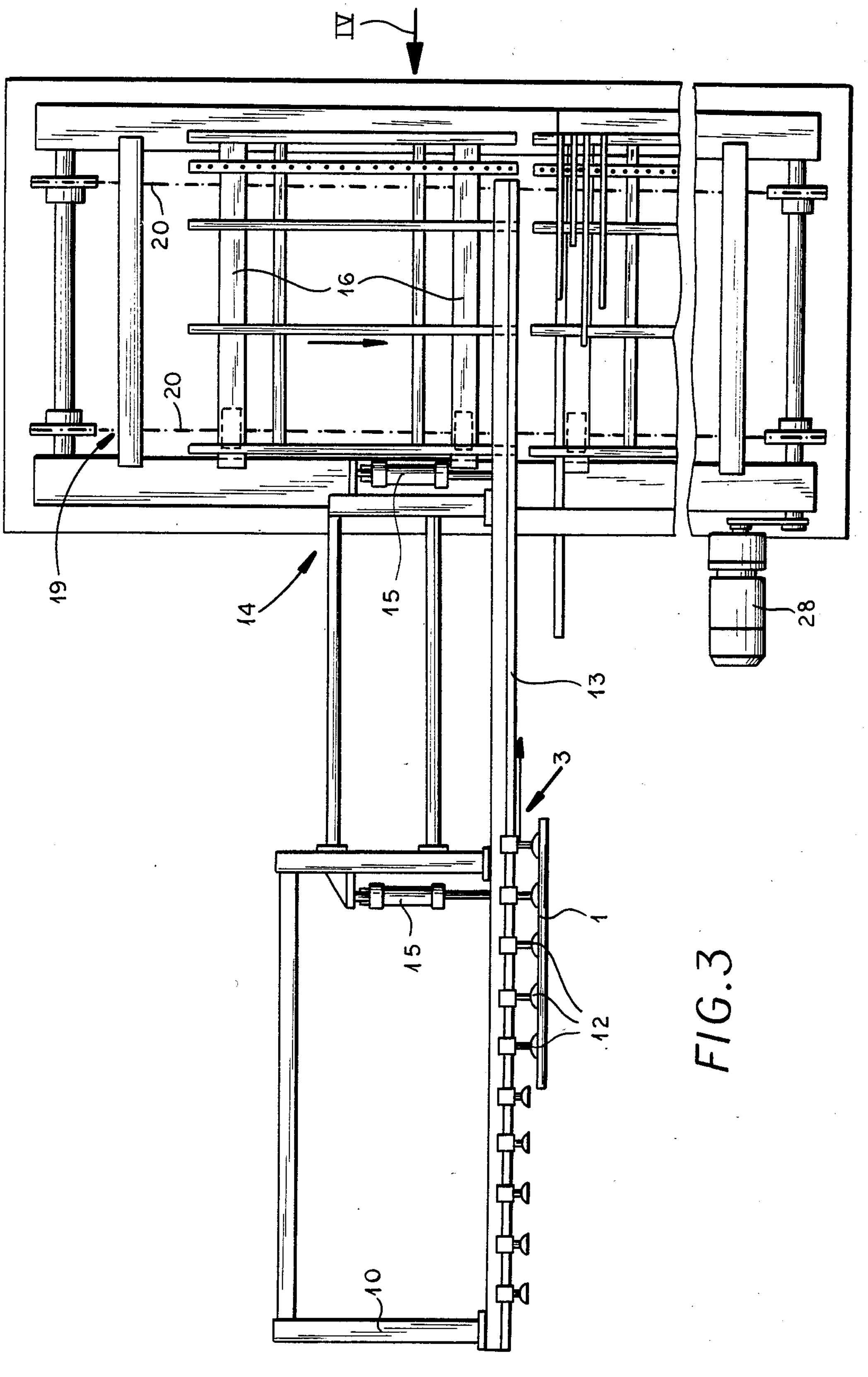
FIG. 3 is a large-scale top view of a detail of FIG. 1.

As seen in FIG. 2 the rollers 24' of the conveyor 3 can be vertically displaced on a beam 7 by means of actuators 22 in the sealing unit 4 so that once a workpiece 1 is therein it can be raised somewhat. This unit 4 is provided with horizontal guide rails 5 and with abutment cylinders 21 against which a face of the panel can rest.

Inside the edge-sealing unit 4 is a standard extruder head 6 of the type described in the above-cited patent references. This extruder 6 can move vertically on an upright carriage bar 9 that in turn can move horizontally on rails 25 by means of an appropriate drive including a motor 26 operated by a controller 27. These rails 25 in turn are supported on upright posts 10. Thus the head 6 can move about a stationary workpiece 1 sealing all its edges and orienting itself by rotation of its extruder tip about a horizontal axis perpendicular to the direction D.

In addition the posts 10 of the station 4 support suction grippers 8 that are normally actuated once a workpiece 1 has been moved by the conveyor 2 into the station 4 and lifted somewhat, as will be described below.

The unloading conveyor 3, as also shown in FIG. 2, comprises a frame 11 displaceable on horizontal rails 13 between an upstream position projecting into the sealing station 4 and a downstream position in a takeoff location 14 shown in FIG. 1. The frame 11 carries horizontally extensible suction grippers 12 and the rail 13 and frame 11 are oriented so that they do not interfere with any structure in the station 4, lying to the rear side of the workpiece 1 with the grippers 81 and posts 10 whereas the bar 9 and edge sealer 6 is on the front face of the workpiece 1. The grippers 12 are vertically between the rails 5 and grippers 8 of the station 4. In addition the entire assembly of the frame 11 can be tipped from a perfectly vertical position to a slightly angled one by means of a cylinder 15 shown in FIG. 4.

Figure 4:
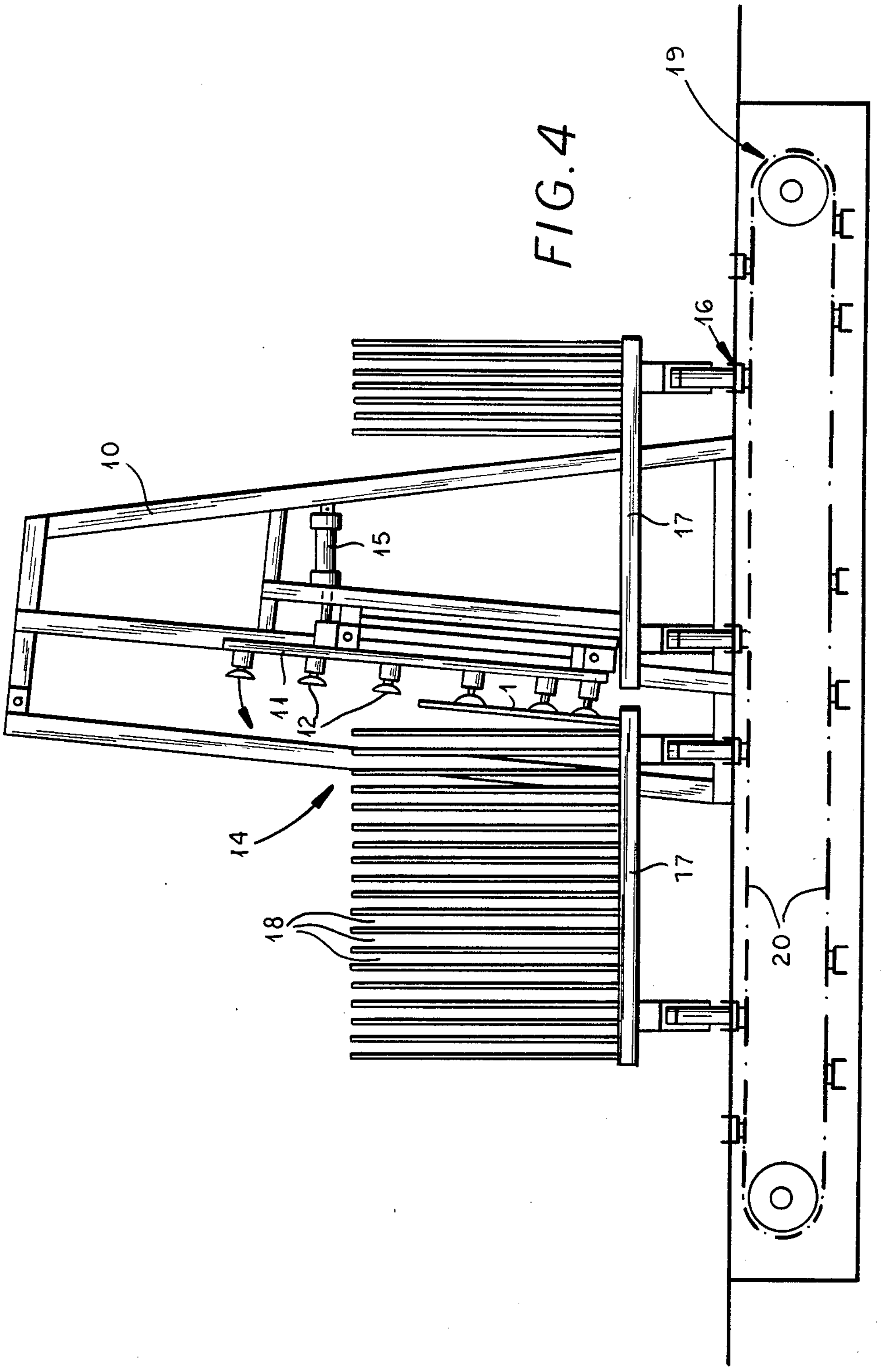
FIG. 4 is an end view taken in the direction of arrow IV of FIG. 3.

The takeoff station 14 as shown in FIG. 4 has carriages or trucks 17 displaceable in the transport direction D and supported on rails 16 carried on chains 20 of a transverse conveyor 19 driven by a motor 28. These carriages 17 each form a plurality of seats 18 for finished sealed workpieces 1. The seats 18 are parallel to the transport direction D and spaced horizontally and perpendicular thereto, the motor 28 being operated by controller 27 to synchronously displace the trucks 17 through a distance equal to the horizontal spacing between each seat 18 on displacement of the unloading frame 11 from out of and back into the sealing station 4 for aligning successive seats 18 with the sealing station 4.

The device described above functions as follows:

A workpiece 1 rolls along the rollers 24 in the conveyor 2 into the station 4 in which the rollers 24' are supported at the same level as the upstream rollers 24. Once in this station, within the area indicated by the dot-dash outline L in FIG. 2, displacement in the direction D is arrested and the beams 7 are lifted by actuator 22 to raise the workpiece 1 a few inches. All these steps are effected by the controller 27.

The the suction grippers 8 are actuated, to which end they normally can be extended horizontally and then retracted as is known to pull the workpiece 1 snugly against the rails 5 and abutments 21, into a perfectly vertical position. Once thus secured the actuators 22 lower the beam 7 and rollers 24' so that the lower longitudinal edge of the workpiece 1 is clear.

Then the sealer 6 moves peripherally around the workpiece 1 in the manner well known in the art, thoroughly sealing the edges.

Once this operation is complete the frame 11 of the conveyor 3 is moved all the way upstream into the FIG. 2 position and its grippers 12 are extended to lock onto the workpiece 1, well within the edges thereof. The grippers 8 then release, and the frame 11 pulls the sealed workpiece back dowstream in the direction D, simultaneously pushing it into a perfectly upright position by means of the cylinder 15. Then the workpiece 1 is deposited in one of the trucks 17. During this unloading cycle another workpiece can be loaded into the station 4.

This machine therefore works very rapidly, holding the workpiece very still when it is having its edges sealed and moving it surely and gently the rest of the time. Since the workpiece is always upright, the machine takes up minimal space.

We claim:

1. An apparatus for sealing the edges of an insulating glass workpiece having outer edges, the apparatus comprising:

- upstream conveyor means including a conveyor for supporting the workpiece upright by one edge and displacing the edge-supported workpiece in a transport direction downstream from an upstream loading station to a sealing station, the upstream conveyor having a vertically displaceable portion in the sealing station;
- an upright holding frame in the sealing station adjacent the vertically displaceable conveyor portion;
- actuator means connected to the conveyor portion for displacing same and the workpiece supported by its lower edge thereon between upper and lower positions;
- lateral holding means including a first set of suction grippers horizontally but not vertically displaceable in the sealing station into and out of engagement with the workpiece in the upper position of same to pull the workpiece tightly in position on the holding frame;
- sealing means having an extruder head in the station for sealing the edges of the workpieces held by the grippers against the frame;
- guide means including vertical and horizontal supports carrying the extruder head for displacing same horizontally along the horizontal edges of the workpiece and vertically along vertical edges thereof while directing the head at the edge it is traveling along;
- an unloading carriage displaceable horizontally in the direction substantially without interfering with the holding frame or sealing head from the sealing station to an unloading station downstream therefrom;
- a second set of suction grippers horizontally displaceable on the unloading carriage perpendicular to the transport direction; and
- control means connected to the two sets of suction grippers for displacing the second set of the unloading carriage against and adhering same to the workpiece held therein by the first set and then releasing the first set from the workpiece.

2. The edge-sealing apparatus defined in claim 1, wherein the holding frame is tipped at a small angle to the horizontal.

3. The edge-sealing apparatus defined in claim 1, further comprising:

- unloading trucks each having a plurality of seats in which the workpiece can stand, the seats being parallel to the transport direction and spaced horizontally and perpendicular thereto; and
- further control means for synchronously displacing the trucks through a distance equal to the horizontal spacing between each seat on displacement of the unloading carriage from out of and back into sealing station for aligning successive seats with the sealing station.

* * * * *